US011301627B2

(12) United States Patent
Gupta et al.

(10) Patent No.: US 11,301,627 B2
(45) Date of Patent: Apr. 12, 2022

(54) CONTEXTUALIZED CHARACTER RECOGNITION SYSTEM

(71) Applicant: SAP SE, Walldorf (DE)

(72) Inventors: Rohit Kumar Gupta, Heidelberg (DE); Johannes Hoehne, Berlin (DE); Anoop Raveendra Katti, Berlin (DE)

(73) Assignee: SAP SE, Walldorf (DE)

( * ) Notice: Subject to any disclaimer, the term of this patent is extended or adjusted under 35 U.S.C. 154(b) by 247 days.

(21) Appl. No.: 16/734,880

(22) Filed: Jan. 6, 2020

(65) Prior Publication Data

US 2021/0209301 A1 Jul. 8, 2021

(51) Int. Cl.
| | |
|---|---|
| *G06F 40/274* | (2020.01) |
| *G06F 40/289* | (2020.01) |
| *G06F 40/30* | (2020.01) |
| *G06V 10/20* | (2022.01) |

(52) U.S. Cl.
CPC ......... *G06F 40/274* (2020.01); *G06F 40/289* (2020.01); *G06F 40/30* (2020.01); *G06V 10/255* (2022.01)

(58) Field of Classification Search
CPC ...... G06F 40/274; G06F 40/289; G06F 40/30; G06K 9/3241; G06K 2209/01; G06K 9/00442
See application file for complete search history.

(56) References Cited

U.S. PATENT DOCUMENTS

| | | | |
|---|---|---|---|
| 9,384,389 B1 | 7/2016 | Sankaranarayanan et al. | |
| 2004/0086179 A1* | 5/2004 | Ma | G06K 9/723 |
| | | | 382/177 |
| 2013/0188863 A1 | 7/2013 | Linderman et al. | |
| 2016/0092740 A1* | 3/2016 | Teller | G06Q 20/382 |
| | | | 348/150 |
| 2016/0162761 A1* | 6/2016 | Bulan | G06K 9/00456 |
| | | | 382/104 |

OTHER PUBLICATIONS

Line Eikvil, OCR—Optical Character Recognition, Dec. 1993, 35 pages. (Year: 1993).*
Extended European Search Report, dated May 10, 2021, for European Patent Appl. No. 20211894.9, 8 pages.

* cited by examiner

*Primary Examiner* — Pierre Louis Desir
*Assistant Examiner* — Keisha Y Castillo-Torres
(74) *Attorney, Agent, or Firm* — Sterne, Kessler, Goldstein & Fox P.L.L.C.

(57) ABSTRACT

System, method, and various embodiments for providing contextualized character recognition system are described herein. An embodiment operates by determining a plurality of predicted words of an image. An accuracy measure or each of the plurality of predicted words is identified and a replaceable word with an accuracy measure below a threshold is identified. A plurality of candidate words associated with the replaceable word are identified and a probability for each of the candidate words is calculated based on a contextual analysis. One of the candidate words with a highest probability is selected. The plurality of predicted words including the selected candidate word with the highest probability replacing the replaceable word is output.

20 Claims, 7 Drawing Sheets

CONTEXTUALIZED CHARACTER RECOGNITION SYSTEM

BACKGROUND

Optical character recognition (OCR) is the process of recognizing or reading characters or text from an image. OCR operates by distinguishing various shapes and objects in the image from the background of the image. Using visual features, OCR may then compare the distinguished shapes and objects against a set of known characters to identify various characters and words which may appear in the image. However, OCR is limited to using visual features to make its determinations and as such has its limitations because sometimes the characters and words are difficult to identify using strictly visual analysis.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing a contextualized character recognition system.

Optical character recognition (OCR) is the process of recognizing or reading characters or text from an image. OCR operates by distinguishing various shapes and objects in the image from the background of the image. Using visual features, OCR may then compare the distinguished shapes and objects against a set of known characters to identify various characters and words which may appear in the image. However, OCR is limited to using visual features to make its determinations and as such has its limitations because sometimes the characters and words are difficult to identify using strictly visual analysis.

Figure 1:
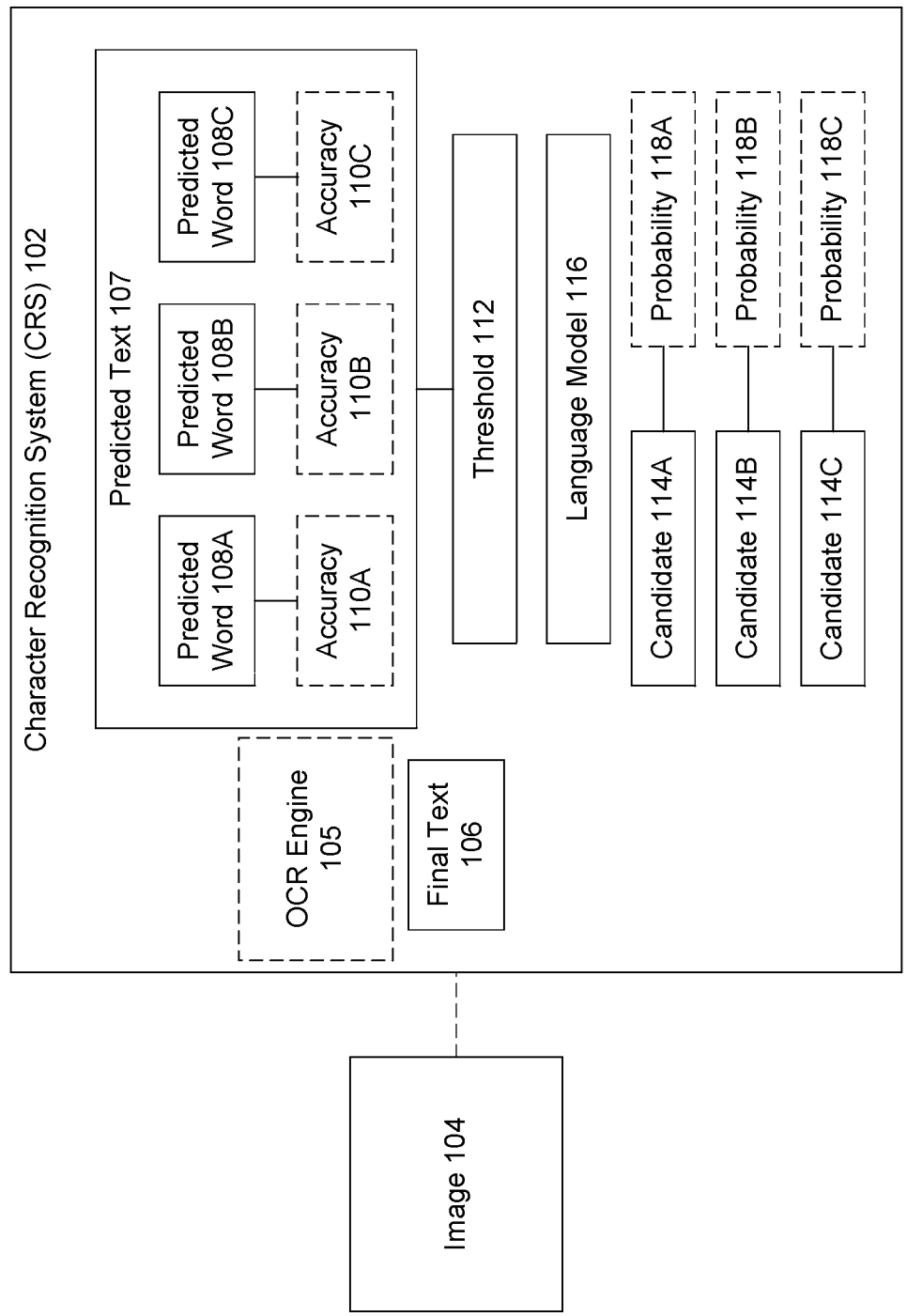
FIG. 1 is a block diagram illustrating example functionality for providing a contextualized character recognition system (CRS), according to some embodiments.

FIG. 1 is a block diagram 100 illustrating example functionality for providing a contextualized character recognition system (CRS) 102, according to some embodiments. In an embodiment, CRS 102 may enhance standard OCR by adding contextualized processing to the identified visual elements, characters, or words of an image 104.

Optical character recognition (OCR) is a computerized process by which one or more computing devices use visual cues within an image to identify the words that may appear in the image. However, one of the problems that OCR encounters is that not all the text is easily readable or identifiable based on computerized visual analysis alone. As such, OCR is prone to output errant words or characters which may not make logical or contextual sense. CRS 102 may enhance standard OCR processing by adding, layering, or implementing contextualized processing to identify the characters, text, words, and/or phrases within an image 104.

CRS 102 may identify the words, characters, symbols, and or objects of an image 104. For example, a user may submit image 104 to CRS 102 for processing, and may receive an output of final text 107 in which one or more words, phrases, characters, symbols, text or other objects across one or more languages from the image 104 are automatically identified (e.g., without user intervention).

In an embodiment, CRS 102 may use an OCR engine 105 to identify predicted text 107. For example, OCR engine 105 may include one or more processors that are configured to perform standard OCR processing of image 104 and output predicted text 107. In another embodiment, CRS 102 may receive image 104 (or portions of image 104) and predicted text 107 from a third-party OCR engine 105 that is not integrated as part of the CRS 102, but which provides predicted text 107 and/or the bounding boxes of image 104 as described in greater detail below.

Predicted text 107 may include one or more characters or words that were initially predicted (using OCR or visual processing) as being displayed across one or more portions, sections, or areas of image 104. The predicted text 107 may include one or more predicted words 108A, 108B, 108C (generally referred to herein as predicted words 108). The predicted words 108 may each include one or more alphanumeric textual symbols and/or characters across one or more languages. Example predicted words 108 include "a", "doctor", "¾", "pint-sized", "$100", and "Awesome!". The predicted words 108 may be grouped or combined together into predicted text 107 which may include a phrase, title, sentence, paragraph, or other logical or contextual grouping of one or more predicted words 108.

In an embodiment, CRS 102 may compute, generate, or determine an accuracy measure 110A, 110B, and 110O for each of the predicted words 108A 108B, and 108C, respectively. Accuracy 110 may be an indication or prediction as to how accurately an OCR engine has indicated a correct predicted word 108. This calculation may be based on language statistics as used by a language model 116. In an embodiment, accuracy may correspond to a contextual accuracy of each predicted word 108 within the context of the remaining predicted words 108 of the predicted phrase or text 107.

Using language model 116, CRS 102 may generate, calculate, or determine accuracies 110A, 110B, 110C for each of the corresponding predicted words 108A, 108B, 108C. Language model 116 may be a program or system, including an artificial intelligence or machine learning system that has been trained to identify erroneous or unlikely words that appear in a sentence. In an embodiment, language model 116 may be trained to understand grammatical rule, phraseology, colloquial sayings, linguistic statistics, and sentence structure across one or more languages. In an embodiment, language model 116 may include its own dictionary and/or thesaurus as well.

As such, language model 116 may be configured to assign, generate, or calculate percentages or other measures regarding the correctness or likelihood of the various words within a sentence or phrase as belonging in the sentence or phrase using contextual analysis. In an embodiment, language model 116 may take into account the relative context (e.g., the phrase before and/or after a selected word) to identify the probability, accuracy, or correctness of the selected word. In an embodiment, language model 116 may compare each predicted word 108 against every other predicted word 108 of predicted text 107 to determine which predicted words 108 are the most and least likely to be accurate or inaccurate and belong or not belong in the predicted text 107.

In a simple example, if predicted text 107 was "The dog klumped over the log." Language model 116 may output probabilities for each word, and assign a lowest accuracy to the word "klumped" because it does not appear in a dictionary and/or does not seem to make contextual sense with regard to the rest of the words. CRS 102, through the processing described herein, identified and analyzes various replacements or candidates for the word "klumped", and outputs final text 106 that indicates "The dog jumped over the log."

Various letters or symbols of image 104 may be difficult to visually identify. As provided in the example above, "jumped" may have been predicted to be the word "klumped". Or in another example, a vertical line may be the number "1", the lowercase letter "l", the uppercase letter "L", the uppercase letter "I", the lowercase letter "i", or a pipe symbol "|". Without human intervention, it may impossible for a system using only OCR or visual analysis to distinguish which letter or symbol makes the most sense in a particular predicted word 108 within a particular predicted phrase or text 107.

As such, the accuracy measure 110 for the predicted words 108 may be used to identify those words or characters with possible visual ambiguities based on contextualized processing. Without contextualized processing, these ambiguities may go overlooked or may require human intervention to review—which may still result in the ambiguities being overlooked because a human reviewer is still prone to making mistakes. The OCR engine and/or CRS 102 may be able to predict or compute a level of ambiguity or likely accuracy of each predicted word 108 as the accuracy measure 110.

In an embodiment, CRS 102 may compare the accuracies 110A-C against a threshold 112. Threshold 112 may be a minimum accuracy or prediction threshold that would need to be satisfied for the predicted word 108A-C to not be further evaluated (to identify' possible replacement words or characters). In an embodiment, comparing accuracy 110 against threshold 112 may indicate whether or not visual ambiguity exists in identifying text of image 104 or whether the corresponding predicted word 108 is to be accepted as being accurate or accurate enough.

For example, threshold 112 may be 80%. Then for example, any predicted word 108A-C with a corresponding accuracy 110A-C that is less than 80% may undergo additional contextual processing as described herein to determine candidate words 114 to replace the potentially errant predicted word 108. The result of the additional contextualized processing may result in producing the same word as the predicted word 108 (e.g., thereby effectively increasing its accuracy) and/or may identify a replacement word with a greater confidence, prediction, probability, or accuracy measure.

In an embodiment, if no replacement word with a probability of belonging (e.g., accuracy 110) that satisfies threshold 112 is identified, then either the original predicted word 108 may be used, or the replacement word with the highest probability or accuracy measure may be selected to replace the originally predicted word 108 with the accuracy that is below threshold 112.

In an embodiment, CRS 102 may select predicted word 108A for additional processing and possible replacement because accuracy measure 110A is less than threshold 112. CRS 102 may then identify a set of candidates 114A, 114B, and 114C that include one or more alternative characters, letters, or symbols (relative to the selected predicted word 108A) as possible alternatives to replace predicted word 108A in a final output text 106. The process for identifying candidates 114 is discussed in greater detail further below.

Using language model 116, CRS 102 may generate, calculate, or determine probabilities 118A, 118B, 118C for the identified replacements for the selected predicted word 108A, referred to herein as candidates 114A, 114B, 114C. As indicated above, language model 116 may be a program or system, including an artificial intelligence or machine learning system that has been trained to identify erroneous or unlikely words that appear in a sentence. The language model 116 used to use language statistics to identify probabilities 118, may be the same language model 116 used to identify accuracies 110.

In an embodiment, as used herein, the terms accuracy 110 and probability 118 may be used to refer to the same unit or type of measurement with regard to the likelihood of correctness of a particular word as belonging in the phrase of predicted text 107, and the terms may be used interchangeably. However for clarity's sake, probability 118 may be used to refer to the likelihood of correctness of a candidate 114, while accuracy 110 may be used to refer to the likelihood of correctness of an initially predicted word 108 (e.g., which were determined using visual methods of identification from image 104, such as OCR). A selected predicted word 108 may be determined or generated prior to the generation of one or more candidate words 114 used to replace the selected predicted word 108.

Figure 2A:
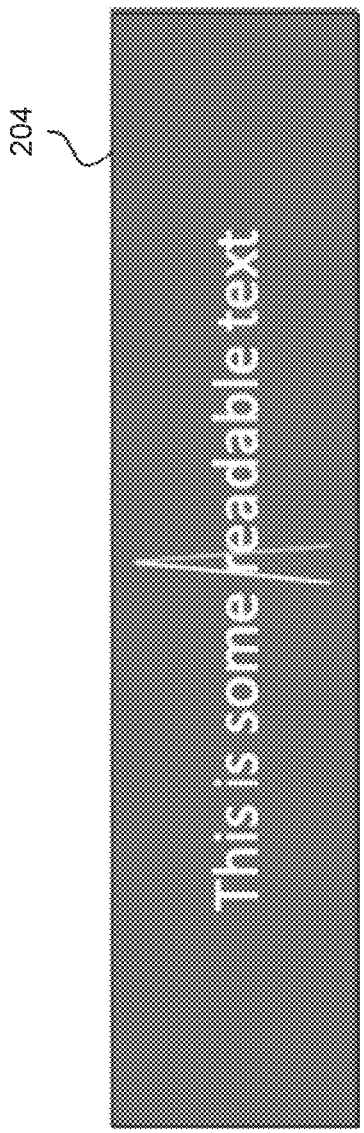
FIG. 2A illustrates an example image 204 from which text is extracted, according to an example embodiment.

FIG. 2A illustrates an example image 204 from which text is extracted, according to an example embodiment. Using an OCR engine, CRS 102 may identify five different words in image 204. Using visual analysis, the OCR engine may be able to clearly read or detect the characters of the words "This" "is" "some" and "text".

However, due to the image quality, design, or visual distortion, the first character of the word "readable" may be difficult for an OCR engine to detect. In an embodiment, the OCR engine may predict the word to be "Aeadable" based on the visual appearance or characteristics of the text of the image 204.

Figure 2B:
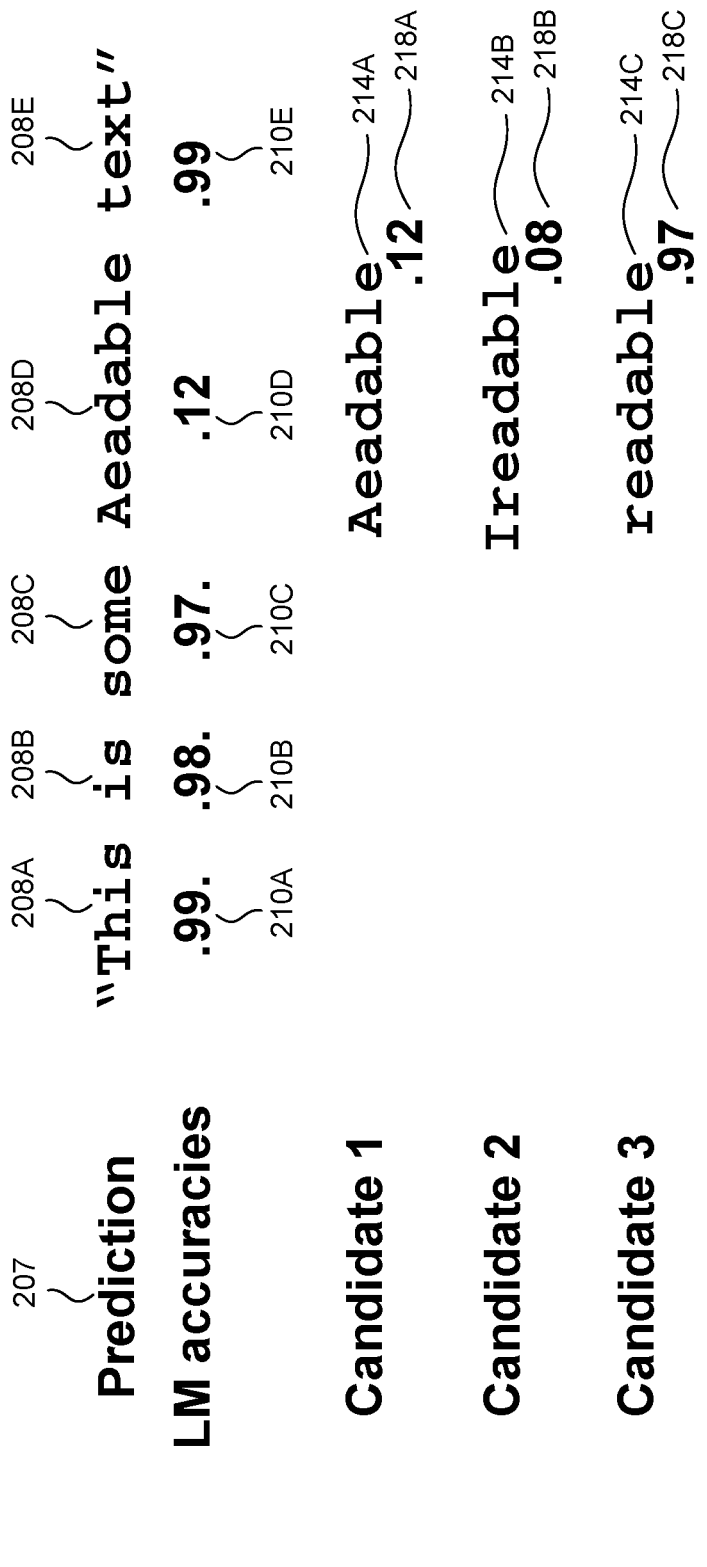
FIG. 2B illustrates an example of OCR and contextualized character recognition processing, according to an example embodiment.

FIG. 2B illustrates an example of OCR and contextualized character recognition processing, according to an example embodiment. Predicted text 207 may include the text, symbols, and/or characters that were detected or identified through visual processing of the image 204. As illustrated, predicted text 207 includes predicted words 208A-208E. The predicted text 207 may be provided to a language model 116, which using linguistic and statistical analysis, may generate or compute the corresponding accuracies 210A-210E for each predicted word 208.

In an embodiment, threshold 112 for predicted text 207 may be 70% or 0.70. As illustrated, predicted word 208D may have an accuracy 210D that is below the threshold 112. As such, CRS 102 may identify candidate words 214 (as scored by a language model 116) to replace the selected predicted word 208D "Aeadable". In other embodiments, multiple different thresholds 112 may be used to evaluate the same predicted text 207, resulting in varying combinations of predicted words 208 to be selected for evaluation, and different sets of candidate words 214 generated or identified.

In an embodiment, the language model 116 may be an artificial intelligence or machine learning based system that needs to be trained. One such training may include three-class classification training. For example, in training the language model 116, each character of a word or phrase (except a space) is labeled as 0. And the space followed by each word may be labeled as 1 if the preceding word is correct, or 2 if the preceding word is incorrect. As such, language model 116 may be trained as a three-class classification problem for each character.

During the training process, a few words in a sentence may be selected and negative words may be generated in a dataset by: replacing a character randomly, deleting a character randomly, repeating a character randomly, and/or adding a character randomly. The language model 116 may then be trained to output the probability for each character for the three given classes: zero, one, two. Zero may indicate that the output as being a character of a word, one indicates the end of the preceding word as being correct, and two indicates the end of the preceding word as being incorrect. In other embodiments, other language model 116 training techniques and operations may be used.

Below will be described various techniques that may be used by CRS 102 to generate or identify one or more candidate words 114 as possible alternatives to replace an originally predicted word 208D with an accuracy 210D below threshold 112. CRS 102 may then select the candidate 214 with the highest likelihood of belonging in the predicted text 207, as determined by the language model 116 which is configured to score each word within the context of one or more of the other words of the predicted text 207.

In an embodiment, additional information may be retrieved for each selected predicted word 208D with an accuracy 210D that falls below a particular selected threshold 112. This additional information may include bounding box details and/or its segmentation mask, which may be used to identify the predicted word 208D from the image 204.

In an embodiment, CRS 102 may extract bounding box information for both the predicted word 208D, and bounding box information for each character of the predicted word 208D. This character bounding box information may be mapped in the segmentation mask. In an embodiment, CRS 102 may calculate or determine all the pixel values from a sub-segmentation mask representing a character. CRS 102 may then repeat this process for each character of the selected predicted word 208D.

In an embodiment, each pixel value may represent a letter, and so for each character there may be one or multiple characters or letters. The result may be that for one or more characters of predicted word 208D, there may be multiple possible letters. Using combinatorics, CRS 102 may then generate various possible candidates 114. For example, a predicted word "log" in which the first character is a number one, the possible candidates 114 may include "log" in which the first character is the number one, "log" in which the first character is lowercase L, and "tog".

In an embodiment, non-maximal suppression (NMS) may be used to identify one or more candidates 114. NMS may be used by CRS 102 to choose a single bounding box from a set of various bounding boxes, by using various bounding box combination or compression techniques based on the area of overlap between bounding boxes to identify candidates 114.

For example, during OCR multiple instances of the same object may be proposed through various bounding boxes. Thus, NMS (or other techniques) may be used to filter the list of candidate box proposals and obtain the best proposal (as determined based on the technique being used). In an embodiment, the applied NMS algorithm may discard the bounding boxes predicted by the word box center coordinates if it is below certain threshold and picks the one with the highest probability. The remaining bounding boxes which are close may also be discarded based on the overlap value (i.e. Intersection over Union (IoU) value).

In an embodiment, CRS 102 may use multiple different NMS overlap values, each of which may predict a unique or different word. Example NMS overlap threshold values which may be used are [0.075, 0.2, 0.3, 0.4, 0.5]. CRS 102 may then generate a set of words as possible candidate words, eliminating any duplicates which may exist. In another embodiment, different NMS thresholds may be used to generate candidate words 114.

Figures 3A, 3B:
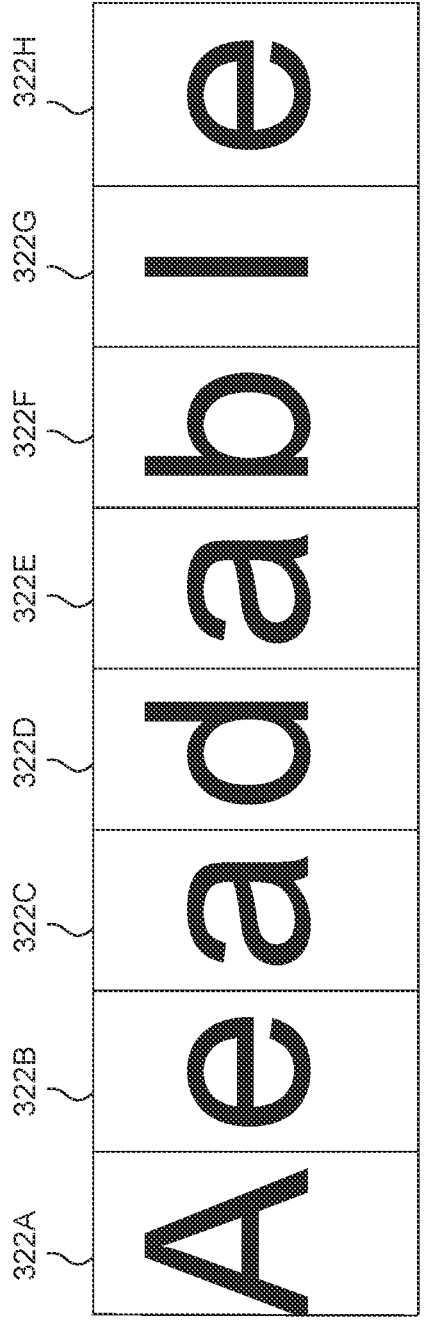
FIG. 3A illustrates an example word box, according to an embodiment.
FIG. 3B illustrates an example set of character boxes corresponding to an identified word bounding or word box, according to an example embodiment.

FIG. 3A illustrates an example word box 324, according to an embodiment. In an embodiment, word box 324 may correspond to a bounding box, or a resulting bounding box (after applying NMS) from image 204. The word box 324 may include predicted characters that make up the predicted word "Aedable" from image 204, which may be used as a candidate 214 (which may correspond to the similarly numbered candidates 114).

FIG. 3B illustrates an example set of character boxes 322 corresponding to an identified word bounding or word box 324, according to an example embodiment. As noted above, each word box 324 may comprise or be assembled from a set of character boxes 322, or character bounding boxes. The character boxes 322A-F illustrate the example characters that were used to generate the word box 324. In an embodiment, the illustrated character boxes 322A-F may be the resultant boxes from applying NMS to character bounding boxes from image 204.

Figure 3C:
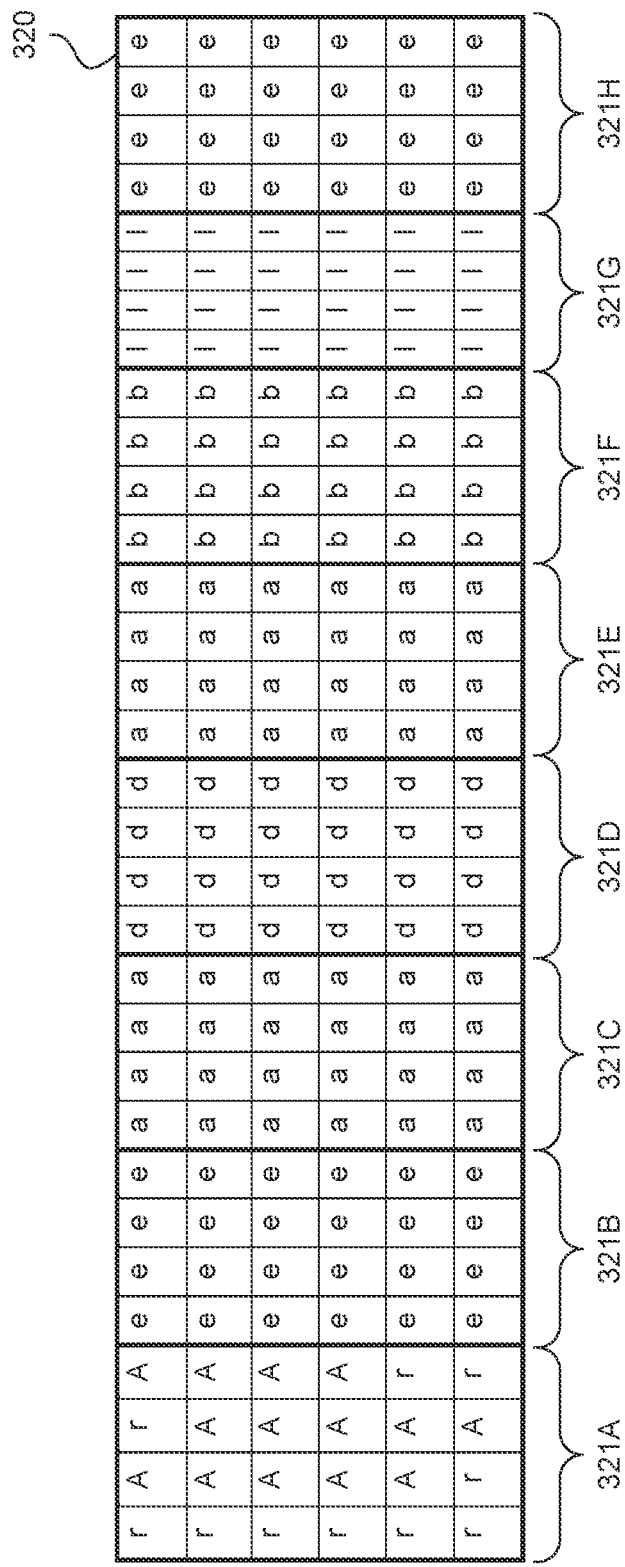
FIG. 3C illustrates an example word grid with a pixel view, according to an example embodiment.

FIG. 3C illustrates an example word grid 320 with a pixel view, according to an example embodiment. In an embodiment, word grid 320 may be generated using pixel analysis. In pixels analysis or pixel wise prediction, CRS 102 may analyze various pixels (particularly border pixels) of image 104 or portions thereof, and based on the pixel analysis, identify or predict a most likely character to which that the pixel corresponds. Each box of word grid 320 may correspond to a particular pixel of image 104, as may be detected from a character bounding box.

For example, OCR may generate bounding boxes for each character of a predicted word 208D (as illustrated in FIG. 3B). Using pixel wise prediction, on a subset of the border pixels of each character, CRS 102 may generate the character grids 321A-H that include the various character predictions based on the border pixel predictions. As illustrated, each of the character grids 321B-321I may include all of the same predicted characters, while character grid 321A includes two possible characters.

Character grid 321A predicts both characters "A" and "r". In an embodiment, CRS 102 may analyze the various combinations or possible alternative characters to identify the most likely character or characters for each grid 321, thus producing one or more candidate words.

In an embodiment, CRS 102 may obtain for each character in the character grids 321, all of the unique characters or character combinations at the pixel level. For example, this may yield the output: [[r, A], [e], [a], [d], [a], [b], [l], [e]]. The possible candidates 114 then may be both "read-able" and "Aeadable".

In an embodiment, as illustrated in grid 321A, "A" may appear more than "r", and thus the predicted character output for the first character box 322A (of FIG. 3B) may be "A". Or, for example, the character grid analysis may produce two possible alternatives for the first character box 322A, one may be "A" and one may be "r". For example, in performing a column-by-column analysis, the first column of subsection 321A may yield "r" as being the most dominant character, while the other three columns of subsection 302A may yield "A" as being the most dominant character.

Using a segmentation approach, the most frequented character from each column of a character grid 321 may be selected and may be arranged together. For example, the most frequented character may output: [r, A, A, A, e, e, e, e, a, a, a, a, d, d, d, d, a, a, a, a, b, b, b, b, l, l, l, l, e, e, e, e]. Then, from this intermediate output, consecutive duplicates may be removed. The resulting output would be the candidate 114: rAeadable. A subset of possible candidates using various techniques of candidate generation are illustrated in FIG. 2B, as candidates 214A, 214B, and 214C.

As referenced above, in an embodiment, CRS 102 may generate predicted text 207 using an OCR system, and may submit or provide predicted text 207 to language model 116. Language model 116 may then generate or output the accuracies 210A-E of at least a subset of the predicted words 208A-E. CRS 102 may select the candidate word 208D with the lowest accuracy 210D (as determined by language model 116), or accuracy that falls below a selected threshold 112 for additional processing.

CRS 102 may then use a variety of different techniques to generate new candidate words 214A-C to replace the selected predicted word 208D. Using language model 116, CRS 102 may generate corresponding probabilities 218A-218C for each candidate 214A-C, and determine which candidate (if any) to select to replace the selected predicted word 208D.

In an embodiment, CRS 102 may select the candidate 214C with the highest probability 218C (which may or may not exceed the threshold 112). CRS 102 may then replace the selected predicted word 208D with the highest scoring candidate 214C to generate final text 206. This final text 206 may then be embedded with a picture, used to categorize, tab, or label, image 204, displayed on a screen of a user device, or used to perform a search.

Figure 4:
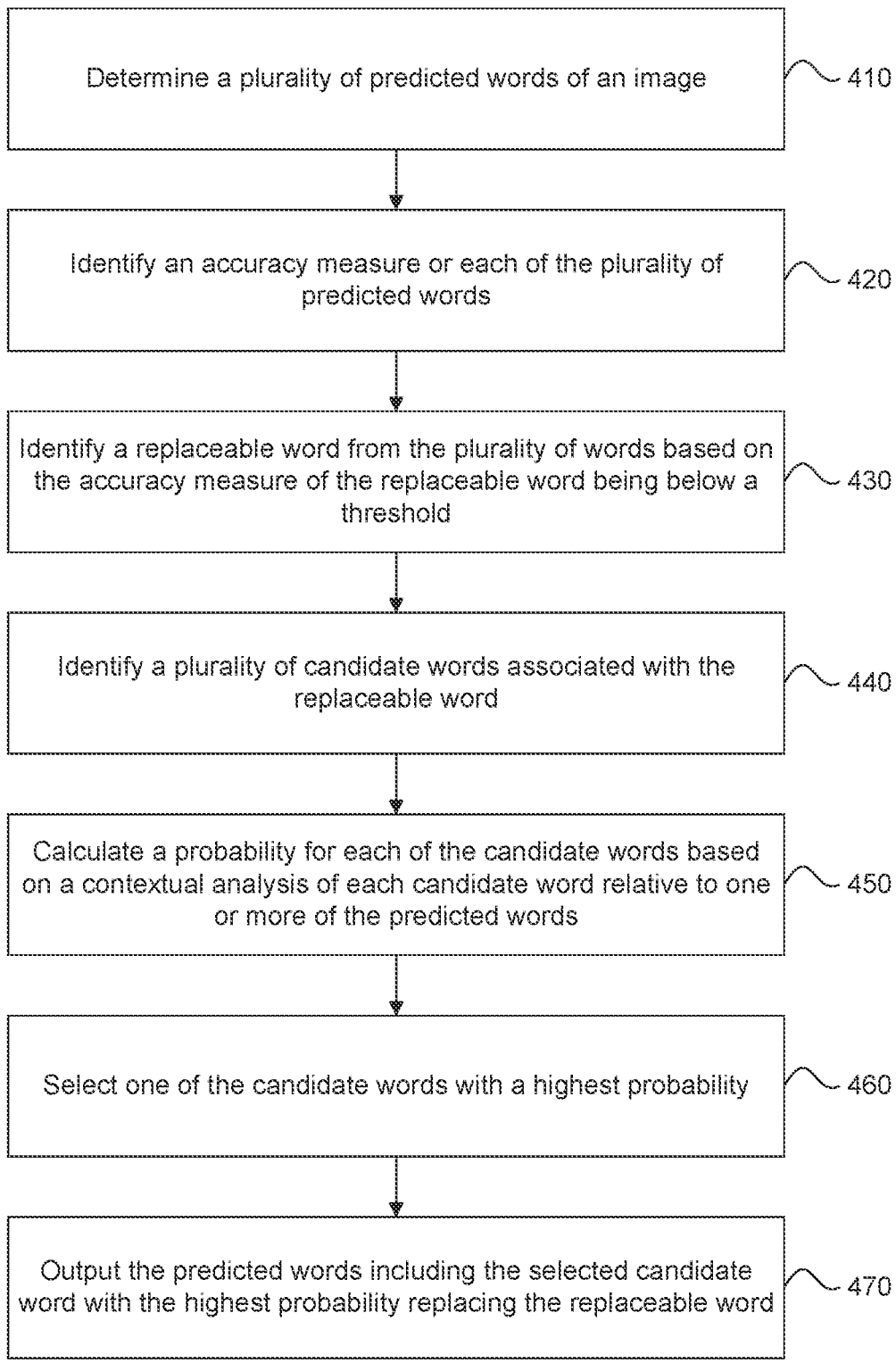
FIG. 4 is a flowchart illustrating example operations for providing a contextualized character recognition system, according to some embodiments.

FIG. 4 is a flowchart 400 illustrating example operations for providing a contextualized character recognition system (CRS 102), according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art. Method 400 shall be described with reference to FIG. 1, FIG. 2A, and FIG. 2B.

In 410, a plurality of predicted words of an image are determined. For example, CRS 102 may use optical or visual analysis, such as OCR, to generate predicted text 207 of image 204.

In 420, an accuracy measure or each of the plurality of predicted words is identified. For example, using a language model 116, CRS 102 may receive, calculate, or generate accuracies 210A-210E for each predicted word 208A-208E of predicted text 207. As noted above, the accuracy 210 may be a correctness measure or probability of each predicted word 108 as being correct or belonging within predicted text 107 (e.g., based on the contextual rules of language model 116).

In 430, a replaceable word from the plurality of words based on the accuracy measure of the replaceable word being below a threshold is identified. For example, CRS 102 may determine that the accuracy 210D of predicted word 208D falls below a selected threshold 112, and thus may be identified as a replaceable word. In an embodiment, multiple varying thresholds may be used and tested against the accuracies 210 of the predicted words 208 to determine varying replaceable words.

In 440, a plurality of candidate words associated with the replaceable word are identified. For example, using various candidate generation techniques, CRS 102 may generate three candidate words 214A-C to possibly replace the replaceable predicted word 208D.

In 450, a probability for each of the candidate words is calculated based on a contextual analysis of each candidate word relative to one or more of the predicted words. For example, using language model 116, CRS 102 may receive the identified probabilities 218A-C corresponding to the candidates 214A-C. In an embodiment, accuracy 210 and probability 218 may be calculated based on the contextual analysis in which a phrase including one or more predicted words 108 appearing prior to a selected one of the plurality of predicted words (e.g., a replaceable word) is compared to a phrase of one or more predicted words appearing after the selected one of the plurality of predicted words 108. Or, for example, the replaceable word or candidate words may only be compared to a preceding or following phrase from predicted text 107 (e.g., if the selected word appears at the end or the beginning of the predicted text 107).

In 460, one of the candidate words with a highest probability is selected. For example, candidate 214C with the highest probability 218C (that is greater than the accuracy 210D of the originally predicted word 208D) may be selected. In an embodiment, the candidate 214C may only be selected if the probability 218C exceeds threshold 112.

If, for example, probability 218C does not exceed threshold 112, then in an embodiment, deference may be provided to the original prediction and the predicted word 208D may be used even if candidate 214C has a probability 218C that exceeds accuracy 210D. In another embodiment, the candidate with the highest probability 218A-C, may be selected even if less than threshold 112.

In an embodiment, CRS 102 may use two or more threshold measures 112. For example, a first threshold 112 may be used to determine if a predicted word 108 should be replaced (with a candidate 114). And a second threshold 112 may be used to determine if the selected candidate 114 has a high enough probability 118 (to either be used as a candidate 114 or be used to replace a predicted word 108). In an embodiment, CRS 102 may use different threshold values 112.

In 470, the predicted words including the selected candidate word with the highest probability replacing the replaceable word is output. For example, CRS 102 may generate and output final text 207.

Figure 5:
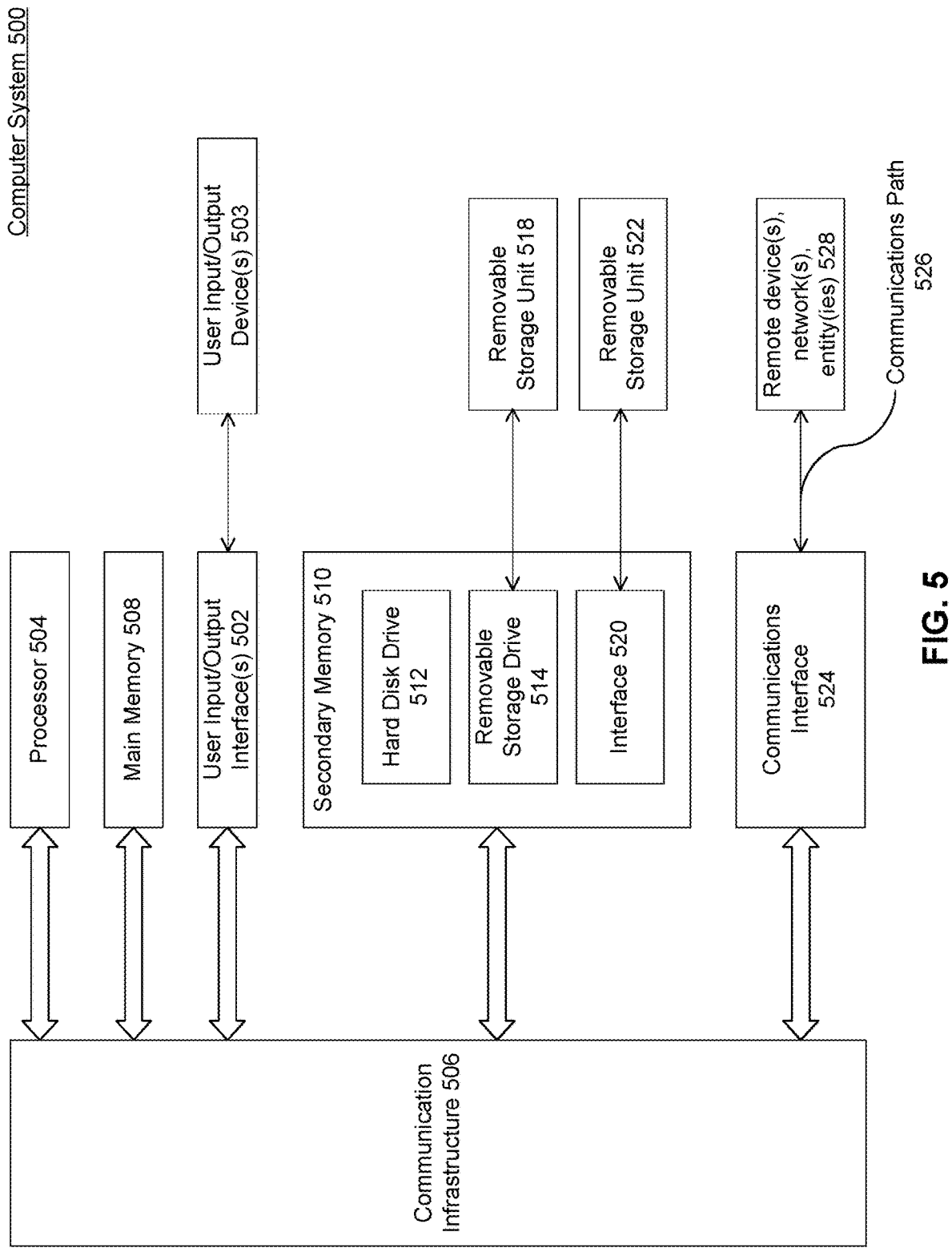
FIG. 5 is example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include customer input/output device(s) 503, such as monitors, keyboards, pointing devices, etc., which may communicate with communication infrastructure 506 through customer input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
   determining a plurality of predicted words of an image, wherein the plurality of predicted words is generated based on an optical analysis of the image;
   identifying an accuracy measure for each of the plurality of predicted words based on a language model, wherein the language model that has been trained to identify erroneous or unlikely words and is configured to generate the accuracy measure;
   identifying a replaceable word from the plurality of predicted words based on the accuracy measure of the replaceable word being below a threshold;
   identifying a plurality of characters of the replaceable word, wherein each character comprises a plurality of pixels, including both border pixels and non-border pixels;
   selecting a first character of the plurality of characters of the replaceable word;
   performing pixel analysis on a subset of the plurality of pixels of the selected first character of the replaceable word, wherein the pixel analysis produces a prediction as to which character is represented by each of the plurality of pixels of the subset, and wherein the pixel analysis predicts at least two different characters for the plurality of pixels of the subset;
   identifying a plurality of candidate words associated with the replaceable word based on both the at least two different characters predicted by the pixel analysis;
   calculating a probability for each of the plurality of candidate words based on a contextual analysis of each candidate word relative to one or more of the plurality of predicted words;
   selecting one of the plurality of candidate words with a highest probability, wherein the probability of the selected candidate word exceeds the accuracy measure and the threshold; and
   outputting the plurality of predicted words including the selected candidate word with the highest probability replacing the replaceable word.

2. The method of claim 1, further comprising:
   receiving the image;
   identifying a plurality of characters in the image; and
   grouping the plurality of characters into the plurality of predicted words.

3. The method of claim 1, wherein the accuracy measure is calculated based on the contextual analysis in which a phrase of one or more predicted words appearing prior to a selected one of the plurality of predicted words is compared to a phrase of one or more predicted words appearing after the selected one of the plurality of predicted words.

4. The method of claim 1, wherein the identifying the plurality of candidate words comprises:
   determining that the replaceable word comprise a plurality of characters;
   identifying, for at least one of the plurality of characters, an alternative character; and
   identifying the replaceable word, including the alternative character, as being one of the plurality of candidate words.

5. The method of claim 4, wherein the identifying the alternative character is based on an optical analysis of the at least one of the plurality of characters.

6. The method of claim 1, wherein the identifying the plurality of candidate words comprises:
   generating one of the plurality of candidate words using non-maximal suppression with a plurality of threshold values.

7. The method of claim 1, wherein the identifying the plurality of candidate words comprises:
   identifying a character prediction for each pixel across a plurality of pixels for at least one character in the replaceable word, wherein the replaceable word comprises a plurality of characters;
   determining that at least two different predictions exist across the plurality of pixels, including a first prediction and a second prediction; and
   identifying a first one of the plurality of candidate words comprising the first prediction and the plurality of characters.

8. The method of claim 7, further comprising:
   identifying a second one of the plurality of candidate words comprising the second prediction and the plurality of characters.

9. A system comprising:
   a memory; and
   at least one processor coupled to the memory and configured to perform operations comprising:
   determining a plurality of predicted words of an image, wherein the plurality of predicted words is generated based on an optical analysis of the image;
   identifying an accuracy measure for each of the plurality of predicted words based on a language model, wherein the language model that has been trained to identify erroneous or unlikely words and is configured to generate the accuracy measure;

identifying a replaceable word from the plurality of predicted words based on the accuracy measure of the replaceable word being below a threshold;

identifying a plurality of characters of the replaceable word, wherein each character comprises a plurality of pixels, including both border pixels and non-border pixels;

selecting a first character of the plurality of characters of the replaceable word;

performing pixel analysis on a subset of the plurality of pixels of the selected first character of the replaceable word, wherein the pixel analysis produces a prediction as to which character is represented by each of the plurality of pixels of the subset, and wherein the pixel analysis predicts at least two different characters for the plurality of pixels of the subset;

identifying a plurality of candidate words associated with the replaceable word based on both the at least two different characters predicted by the pixel analysis;

calculating a probability for each of the plurality of candidate words based on a contextual analysis of each candidate word relative to one or more of the plurality of predicted words;

selecting one of the plurality of candidate words with a highest probability, wherein the probability of the selected candidate word exceeds the accuracy measure and the threshold; and outputting the plurality of predicted words including the selected candidate word with the highest probability replacing the replaceable word.

10. The system of claim 9, wherein the operation further comprise:
receiving the image;
identifying a plurality of characters in the image; and
grouping the plurality of characters into the plurality of predicted words.

11. The system of claim 9, wherein the accuracy measure is calculated based on the contextual analysis in which a phrase of one or more predicted words appearing prior to a selected one of the plurality of predicted words is compared to a phrase of one or more predicted words appearing after the selected one of the plurality of predicted words.

12. The system of claim 9, wherein the identifying the plurality of candidate words comprises:
determining that the replaceable word comprise a plurality of characters;
identifying, for at least one of the plurality of characters, an alternative character; and
identifying the replaceable word, including the alternative character, as being one of the plurality of candidate words.

13. The system of claim 12, wherein the identifying the alternative character is based on an optical analysis of the at least one of the plurality of characters.

14. The system of claim 9, wherein the identifying the plurality of candidate words comprises:
generating one of the plurality of candidate words using non-maximal suppression with a plurality of threshold values.

15. The system of claim 9, wherein the identifying the plurality of candidate words comprises:
identifying a character prediction for each pixel across a plurality of pixels for at least one character in the replaceable word, wherein the replaceable word comprises a plurality of characters;
determining that at least two different predictions exist across the plurality of pixels, including a first prediction and a second prediction; and
identifying a first one of the plurality of candidate words comprising the first prediction and the plurality of characters.

16. The system of claim 15, the operations further comprising:
identifying a second one of the plurality of candidate words comprising the second prediction and the plurality of characters.

17. A system comprising:
a memory; and
at least one processor coupled to the memory and configured to perform operations comprising:
determining a plurality of predicted words of an image, wherein the plurality of predicted words is generated based on an optical analysis of the image;
identifying an accuracy measure for each of the plurality of predicted words based on a language model, wherein the language model that has been trained to identify erroneous or unlikely words and is configured to generate the accuracy measure;
identifying a replaceable word from the plurality of predicted words based on the accuracy measure of the replaceable word being below a threshold;
identifying a plurality of characters of the replaceable word, wherein each character comprises a plurality of pixels, including both border pixels and non-border pixels;
selecting a first character of the plurality of characters of the replaceable word;
performing pixel analysis on a subset of the plurality of pixels of the selected first character of the replaceable word, wherein the pixel analysis produces a prediction as to which character is represented by each of the plurality of pixels of the subset, and wherein the pixel analysis predicts at least two different characters for the plurality of pixels of the subset;
identifying a plurality of candidate words associated with the replaceable word based on both the at least two different characters predicted by the pixel analysis;
calculating a probability for each of the plurality of candidate words based on a contextual analysis of each candidate word relative to one or more of the plurality of predicted words;
selecting one of the plurality of candidate words with a highest probability, wherein the probability of the selected candidate word exceeds the accuracy measure and the threshold; and
outputting the plurality of predicted words including the selected candidate word with the highest probability replacing the replaceable word.

18. The device of claim 17, the operations further comprising:
receiving the image;
identifying a plurality of characters in the image; and
grouping the plurality of characters into the plurality of predicted words.

19. The device of claim 17, wherein the accuracy measure is calculated based on the contextual analysis in which each of the plurality of predicted words is compared to one or more other of the plurality of predicted words.

20. The method of claim 1, wherein the performing pixel analysis comprises:
selecting a most dominant character from each column of a character grid comprising predictions for a subset of the subset of the plurality of pixels to identify the at least two different characters.

* * * * *